United States Patent
Kosugi et al.

(10) Patent No.: US 7,922,797 B2
(45) Date of Patent: Apr. 12, 2011

(54) CANISTERS

(75) Inventors: Ryuji Kosugi, Obu (JP); Masataka Suzuki, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 241 days.

(21) Appl. No.: 12/426,377

(22) Filed: Apr. 20, 2009

(65) Prior Publication Data

US 2009/0266236 A1 Oct. 29, 2009

(30) Foreign Application Priority Data

Apr. 25, 2008 (JP) ................................. 2008-115659

(51) Int. Cl.
B01D 53/04 (2006.01)
F02M 33/04 (2006.01)

(52) U.S. Cl. ........................................ 96/147; 123/519
(58) Field of Classification Search .................... 96/108, 96/126, 147, 154; 95/146; 55/385.3; 123/518–520
See application file for complete search history.

(56) References Cited

U.S. PATENT DOCUMENTS

| 5,861,050 | A  | * | 1/1999  | Pittel et al. ....................... 95/115 |
| 7,670,412 | B2 | * | 3/2010  | Kido et al. ........................ 96/147 |
| 7,841,321 | B2 | * | 11/2010 | Kosugi et al. .................. 123/519 |
| 2005/0223900 | A1 | * | 10/2005 | Yoshida et al. .................. 96/108 |
| 2005/0247202 | A1 | * | 11/2005 | Seki ............................... 96/146 |
| 2007/0101865 | A1 | * | 5/2007  | Kim et al. ........................ 96/134 |
| 2009/0223370 | A1 | * | 9/2009  | Kosugi et al. ................... 96/126 |
| 2009/0293728 | A1 | * | 12/2009 | Kosugi et al. ................... 96/154 |
| 2009/0294094 | A1 | * | 12/2009 | Suzuki et al. ................... 165/10 |
| 2010/0147152 | A1 | * | 6/2010  | Kosugi ............................ 96/146 |

FOREIGN PATENT DOCUMENTS

| JP | 8 4605 | 1/1996 |
| JP | 63 246462 | 10/1998 |
| JP | 2005 233106 | 9/2005 |

* cited by examiner

*Primary Examiner* — Frank M Lawrence
(74) *Attorney, Agent, or Firm* — Dennison, Schultz & Macdonald

(57) ABSTRACT

The present invention includes a canister including an adsorption chamber. An adsorption material and a heat storage material are disposed within the adsorption chamber. The heat storage material is molded from a mixture of a plurality of microcapsules and a binder. Each of the microcapsules contains therein a heat-change material. The heat storage material is prevented from moving relative to the chamber wall of the adsorption chamber in at least one of two directions perpendicular to each other.

19 Claims, 8 Drawing Sheets

CANISTERS

This application claims priority to Japanese patent application serial number 2008-115659, the contents of which are incorporated herein by reference.

BACKGROUND OF THE INVENTION

1. Field of the Invention

The present invention relates to canisters used in fuel vapor processing apparatus for preventing fuel vapor, which may be produced within a fuel tank, from dissipating to the atmosphere. In particular, the present invention relates to canisters having an adsorption chamber, in which an adsorption material for desobably adsorbing fuel vapor and a heat storage material for inhibiting variation in temperature by utilizing latent heat are disposed.

2. Description of the Related Art

A known canister used in a fuel vapor processing apparatus is constructed to adsorb and capture fuel vapor, which may be produced by volatilization of gasoline fuel stored within a fuel tank when a vehicle is stopped. Therefore, the vaporized fuel can be prevented from dissipating to the atmosphere. The known canister includes a tank port communication within an upper portion of the fuel tank, an atmospheric port open into the atmosphere, and a purge port, through which fuel vapor desorbed from the adsorption material flows. If fuel vapor is produced, for example, due to increase in temperature during the operation of a vehicle engine or due to stop of the vehicle, the fuel vapor may be adsorbed by the adsorption material as it flows into the canister from the tank port before being discharged from the atmospheric port. Therefore, the fuel vapor can be prevented from dissipating to the atmosphere. The fuel vapor adsorbed by the adsorption material can be desorbed or purged by the air that may be introduced into the canister via the atmospheric port by a negative pressure produced within an intake manifold of the engine during the operation of the engine or by the operation of a suction pump that is drive-controlled independently of the operation of the engine, so that the adsorption material can be regenerated.

The fuel vapor may be liquefied when adsorbed by the adsorption material within the canister. On the contrary, the fuel vapor may be vaporized when desorbed from the adsorption material. Therefore, when the fuel vapor is adsorbed, condensation heat may be produced to increase the temperature of the adsorption material. In other words, adsorption of the fuel vapor causes an exothermic reaction. On the other hand, when the fuel vapor is desorbed, the temperature of the adsorption material may be decreased due to vaporization heat. In other words, desorption of the fuel vapor causes an endothermic reaction. In general, the adsorption material has a porous structure, and therefore, the adsorption capacity of the adsorption material may increase as the temperature decreases, while the adsorption capacity may decrease as the temperature increases. Therefore, in order to improve the adsorption and adsorption property of the adsorption material, it may be desirous to inhibit the exothermic reaction and the endothermic reaction, which may be caused due to change in phase of the fuel, for inhibiting variation in temperature of the adsorption material.

Japanese Laid-Open Patent Publication No. 2005-233106 teaches a canister having an adsorption chamber in which a heat storage material for inhibiting variation in temperature by utilizing latent heat is disposed together with an adsorption material. The heat storage material is in forms of short cylindrical pellets each having a plurality of microcapsules bonded to each by a binder. Each of the microcapsules contains therein a phase-change material. The adsorption material is granulated also in forms of pellets. The heat storage material pellets and the heat storage material pellets are mixed with each other and filled into the adsorption chamber. With this arrangement, potential increase in temperature of the adsorption material that may be caused when adsorbing the fuel vapor may be inhibited by the latent heat (melting heat) produced when the phase of the phase-change materials contained in the heat storage material changes from a solid phase to a liquid phase. On the other hand, potential decrease in temperature of the adsorption material that may be caused when desorbing the fuel vapor may be inhibited by the latent heat (solidification heat) produced when the phase of the phase-change materials contained in the heat storage material changes from a liquid phase to a solid phase.

Japanese Laid-Open Patent Publication Nos. 63-246462 and 8-4605 teach canisters having adsorption chambers, within which heat storage materials having predetermined shapes are fixedly mounted. In each of these publications, the heat storage material has a heat conductive coefficient and a specific heat (heat capacity) that are higher than those of the heat adsorption material, so that sensible heat can inhibit the temperature variation. More specifically, according to Japanese Laid-Open Patent Publication No. 63-246462, a metal plate (or a plurality of metal plates) primarily made of iron or other metallic material is used as the heat storage material. The metal plate is formed to have a predetermined shape so as to be held between opposite wall surfaces defining the adsorption chamber. In the case of a plurality of the metal plates are used, they are assembled together into a predetermined shape. Because the heat storage material made of metal plate(s) is positioned to intersect with a direction of flow of the fuel vapor (to shield the flow path of the fuel vapor), a plurality of small holes are formed in the heat storage material for ensuring the gas to flow therethrough. According to Japanese Laid-Open Patent Publication No. 8-4605, a spirally wound net made of aluminum is used as the heat storage material and is held within the adsorption chamber.

The effect of the heat storage material for inhibiting the temperature variation of the adsorption material is largely affected by the efficiency of transfer of heat from the adsorption material to the heat storage material. Thus, if the variation in temperature of the adsorption material is not effectively transmitted to the heat storage material, the amount of absorption or dissipation of the latent heat by the heat storage material may be decreased, and therefore, it may not be possible to effectively inhibit the temperature variation. It may be important to always maintain a fixed distance between the adsorption material and the heat storage material for the transmission of heat from the adsorption material to the heat storage material.

However, according to the canister of Japanese Laid-Open Patent Application No. 2005-233106, the heat adsorption material pellets and the heat storage material pellets are mixed with each other and filled to be dispersed into the adsorption chamber. Therefore, the heat storage material pellets may move due to vibrations that may be produced during traveling of the vehicle, and therefore, the heat storage material pellets may be unevenly distributed within the adsorption chamber. This may cause unevenness in the distances between the heat adsorption material pellets and the heat storage material pellets, so that it may not be possible to effectively inhibit the temperature variation. In addition, when unevenness distribution of the heat storage material pellets occurs, the efficiency of inhibiting the temperature variation may differ between different regions within the adsorption chamber. Hence, it is not possible to uniformly inhibit the temperature variation over the entire adsorption material.

In the case of each of the canisters of Japanese Laid-Open Patent Publication Nos. 63-246462 and 8-4605, the heat storage material may not move largely by vibrations produced during traveling of the vehicle because the heat storage material(s) having a predetermined shape is fixedly held within the adsorption chamber, and therefore, the distance between the heat storage material and the adsorption material can be substantially maintained. However, the heat storage material utilizes only sensible heat that is consumed for changing the temperature without accompanying change of phase of material. Therefore, the efficiency for inhibiting the temperature variation is low in comparison with a heat storage material that utilizes latent heat accompanying change of phase of material. In addition, the heat storage materials in these publications are made of metal that is limited in formability, and in particular, not suitable to be formed into a complex configuration, such as a honeycomb configuration. Further, the operation for assembling a plurality of the metal plates of the heat storage material of Publication No. 63-246462 into a predetermined configuration and the operation for spirally winding the metal net of the heat storage material of Publication No. 8-4605 are troublesome and may result in low productivity.

Therefore, there is a need in the art for canisters in which uneven distribution of a heat storage material can be avoided and a distance between the heat storage material and an adsorption material can be substantially fixedly maintained.

SUMMARY OF THE INVENTION

One aspect according to the present invention includes a canister including an adsorption chamber. An adsorption material and a heat storage material are disposed within the adsorption chamber. The heat storage material is molded from a mixture of a plurality of microcapsules and a binder. Each of the microcapsules contains therein a heat-change material. The heat storage material is prevented from moving relative to the chamber wall of the adsorption chamber in at least one of two directions perpendicular to each other.

DETAILED DESCRIPTION OF THE INVENTION

Each of the additional features and teachings disclosed above and below may be utilized separately or in conjunction with other features and teachings to provide improved canisters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first embodiment of the present invention will now be described with reference to FIGS. 1 to 3.

Figure 1:
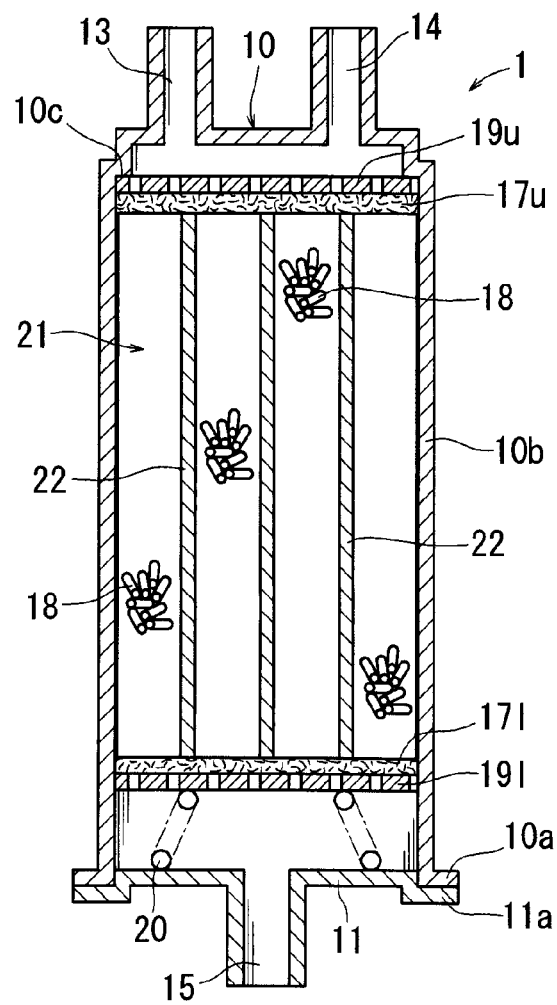
FIG. 1 is a vertical sectional view of a canister according to a first embodiment of the present invention.
Figure 2:
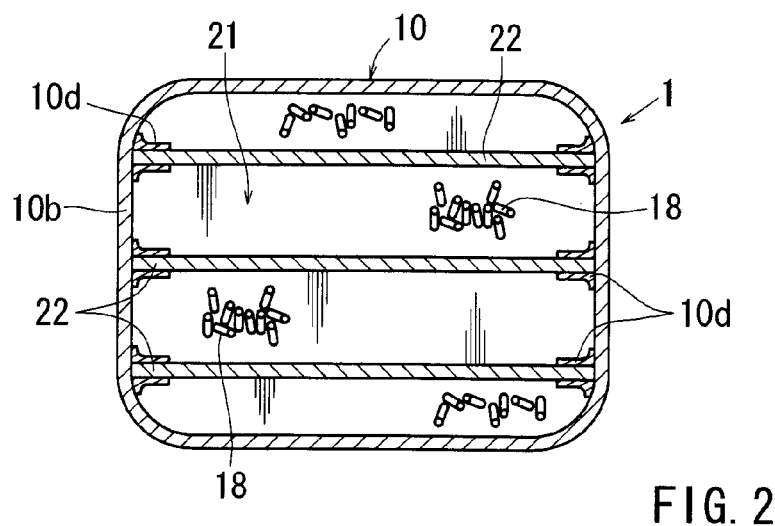
FIG. 2 is a horizontal sectional view of the canister.
Figure 3:
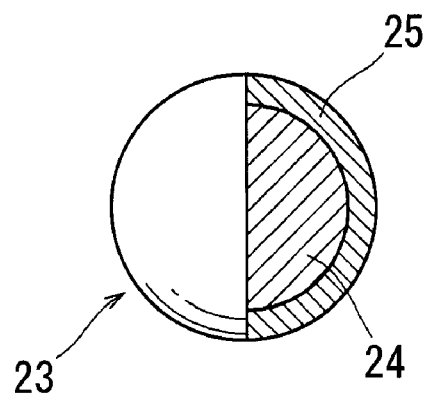
FIG. 3 is a half sectional view of one of microcapsules of a heat storage material disposed within the canister.

Referring to FIGS. 1 and 2, a canister 1 is designed for installation into a fuel vapor processing apparatus (not shown) for processing fuel vapor that may be produced within a fuel tank of an automobile (not shown). The canister 1 includes a canister case 10 and a cover 11 for closing a bottom opening of the canister case 10. The canister case 10 is made of synthetic resin and has a substantially rectangular tubular configuration. The canister case 10 and the cover 11 may be made of the same synthetic resin, such as nylon. The canister case 10 and the cover 11 have a flange 10a and a flange 11a, respectively, that are joined together by using a suitable joining technique, such as vibration welding and adhesion, in a state where the flanges 10a and 11a are in contact with each other. A cylindrical tubular tank port 13 and a cylindrical tubular purge port 14 are formed integrally with an upper wall of the canister case 10 for communicating between inside and outside of the canister case 10. The tank port 13 serves as an inlet port of fuel vapor. The purge port 14 allows desorbed fuel vapor to flow therethrough. A cylindrical tubular atmospheric port 15 is formed integrally with the cover 11 on the side opposite to the tank port 13 for communicating between inside and outside of the canister case 10, so that outside air can flow into the canister case 10 via the atmospheric port 15. An adsorption chamber 21 is defined within the canister case 10 and serves to provide substantially straight flow paths between the tank port 13 and the atmospheric port 15 and between the purge port 14 and the atmospheric port 15. The tank port 13 is in communication within an upper portion of the fuel tank. The purge port 14 is in communication within an intake air pipe of an internal combustion engine (not shown) of the automobile. Alternatively, the purge port 14 may be communicated with a suction pump (not shown) that is drive-controlled independently of the operation of the engine.

Metal plates 19u and 19l each allowing gas to pass therethrough are positioned within an upper portion and a lower portion of the canister case 10, respectively. Upper and lower gas permeable filters 17u and 17l are positioned to contact with the inner faces of the plates 19u and 19l, respectively. The adsorption chamber 21 is delimited by a side wall 10b of the canister case 10 and the upper and lower gas permeable filters 17u and 17l. An adsorption material 18 and a heat storage material 22 are disposed within the adsorption chamber 21. The adsorption material 18 can adsorb and desorb the fuel vapor, and the heat storage material 22 can absorb and dissipate latent heat in response to variation in temperature. In this way, the side wall 10b delimits the front, rear, right and left sides of the adsorption chamber 21, and upper and lower filters 17u and 17l delimit the upper and lower sides of the adsorption chamber 21, respectively. The upper plate 19u is in engagement with a stepped portion 10c formed on the upper portion of the side wall 10b. The lower plate 19l is normally biased upward toward the side of the tank port 13 by a coil spring 20 interleaved between the lower plate 19l and the cover 11. Therefore, the adsorption material 18 can be stored within the adsorption chamber 21 to be substantially uniformly distributed. Each of the filters 17u and 17l may be formed of non-woven fabric made of synthetic resin, urethane form or other suitable material. Each of the metal plates 19u and 19l may be a perforated metal plate having a number of small holes, a metal mesh plate, or any other suitable metal material.

The adsorption material 18 is made of a porous material having a number of pores and capable of adsorbing the fuel vapor molecules. Typically, activated carbon may be used as the adsorption material 18. In this embodiment, the adsorption material 18 is in forms of a number of pellets (hereinafter also called "pellets 18" using the same reference numeral as the adsorption material) each having a short cylindrical configuration. The pellets 18 are made of activated carbon powder bonded together by a suitable binder and granulated into pellets. Therefore, the pellets 18 are distributed over the entire space within the adsorption chamber 21. For example, the pellets 18 may have a diameter of about 1 mm to 3 mm and have a length of about 1 mm to 5 mm. Because the adsorption material 18 is in forms of pellets, it is possible to ensure spaces between the pellets 18 when they are filled into the adsorption chamber 21. Therefore, ability of the adsorption material 18 for allowing gas to flow therethrough can be ensured to avoid potential loss of pressure and potential degradation in an adsorption/desorption ability of the adsorption material 18. The adsorption material 18 may be of any other forms than pellets as long as spaces can be ensured when the adsorption material 18 is filled into the adsorption chamber 21. For example, the adsorption material 18 may be in forms of balls, polygonal columns, flat pieces, or any other suitable shapes.

The heat storage material 22 is in forms of a plurality of flat plates (hereinafter also called "flat plates 22" using the same reference numeral as the heat storage material) each having a plurality of microcapsules 23 bonded together by a suitable binder. Each of the microcapsules 23 has a phase-change material 24 contained therein. More specifically, as shown in FIG. 3, the microcapsule 23 has a hollow spherical outer shell 25, in which the phase-change material 24 is sealingly contained. The phase-change material 24 can absorb or dissipate latent heat in response to variation of temperature. The microcapsules 23 may be manufactured by a coacervation method, an in-situ method (interface reaction method) or any other known methods. The phase-change material 24 may be of any material as long as a phase change is possible between a solid phase and a liquid phase in response to variation in temperature of the adsorption material 18. For example, an organic or inorganic compound having a melting point of about 10 to 80° C. can be used. More specifically, the phase-change material 24 may selected from a group consisting of linear aliphatic hydrocarbon including tetradecane, pentadecane, hexadecane, heptadecane, octadecane, nonadecane, eicosane, henicosane, docosane; hydrate of inorganic compound including natural wax, petroleum wax, $LiNO_3$-$3H_2O$, $Na_2SO_4$-$10H_2O$, $Na_2HPO_4$-$12H_2O$; aliphatic acid including capric acid and lauryl acid; higher alcohol having a carbon number of 12 to 15; and ester including methyl palmitate and methyl stearate. Among these compounds, one having a melting point of about 20° C. is preferable. For example, hexadecane having a melting point of 18° C. and heptadecane having a melting point of 22° C. may be preferable. One of the above compounds or a mixture of two or more of the above compounds can be used for the phase-change material 24. The material of the outer shell 25 may be selected from a group consisting of melamine resin, styrene resin, polyorganosiloxane, and gelatin or a mixture of two or more of these materials. Among these materials, melamine resin may be most preferable. As the binder, various kinds of thermosetting resins can be used. However, in view of the resistance against heat and the strength necessary for use in the canister, phenol resin or acrylic resin may be most preferable.

The heat storage material 22 may be formed by mixing the microcapsules 23 with the binder, molding the mixture into a single flat plate configuration by an extrusion molding process, and cutting the molded flat plate into a plurality of rectangular flat plates. The width of the flat plates 22 is substantially the same as the width of the adsorption chamber 21 in the right and left directions in FIG. 2. The right and left ends along the width of the flat plates 22 are fitted into corresponding pairs of right and left rail-like grooves 10d formed in the inner surface of the side wall 10b of the canister case 10, so that the flat plates 22 extend parallel to each other in the longitudinal direction of the canister 1. Thus, the flat plates 22 are held between two side walls opposed to each other and delimiting the adsorption chamber 21 such that the flat plates 22 extend parallel to the direction of flow of the fuel vapor. In this embodiment, the longitudinal direction of the canister 1 is a vertical direction and is the same as the direction of flow of the fuel vapor. The length of the flat plates 22 is set to be equal to the vertical length of the adsorption chamber 21, so that the upper and lower ends of the flat plates 22 are in contact with the upper and lower filters 17u and 17l, respectively. With this arrangement, the flat plates 22 may be prevented from moving in the vertical direction and the horizontal direction even in the event that vibrations are applied to the canister 1. In this embodiment, the rail-like grooves 10d are provided in three pairs and these pairs of the rail-like grooves 10d are spaced equally from each other. Each of the flat plates 22 is fitted into the corresponding pair of the rail-like grooves 10d, so that the flat plates 22 are positioned parallel to and spaced equally from each other. The adsorption material or pellets 18 are filled into the adsorption chamber 21 such that they are positioned on opposite sides of each of the flat plates 22 and in close contact relationship with each other.

The operation of the canister 1 of the above embodiment will now be described. When the temperature of the fuel tank increases due to a high temperature atmosphere accompanying stopping of the automobile or due to the heat from the engine during traveling of the automobile, the temperature of the gasoline fuel stored within the fuel tank may be increased to the result that a large amount of fuel vapor is produced. The fuel vapor produced within the fuel tank is introduced to the canister 1 via the tank port 13 and flows toward the atmospheric port 15 through the adsorption chamber 21 along a substantially straight path, so that the fuel vapor may be adsorbed by the adsorption material 18 during the flow through the adsorption chamber 21. Upon adsorption by the adsorption material 18, the fuel vapor may be liquefied to generate condensation heat, so that the temperature of the adsorption material 18 may be increased. This increase of the temperature of the adsorption material 18 may lower the adsorption capacity (adsorption ability) of the adsorption material 18. However, because the heat storage material 22 is stored within the adsorption chamber 21 together with the adsorption material 18, the heat of the adsorption material 18 is transferred to the heat storage material 22 to cause change from the solid phase to the liquid phase of the phase-change materials 24 contained within the heat storage material (pellets) 22. Therefore, the heat of the adsorption material 18 may be decreased by the latent heat produced due to change of phase of the phase-change materials 24. As a result, potential increase in temperature of the adsorption material 18 can be inhibited.

When the inside of the canister 1 is brought to have a negative pressure by the incorporation of the negative pressure of the intake air pipe or the operation of the suction pump, air is drawn into the canister 1 via the atmospheric port 15, so that the fuel vapor adsorbed by the adsorption material 18 may be desorbed or purged. The desorbed fuel vapor flows in a direction opposite to the direction of flow of the fuel vapor from the tank port 13 and is discharged from the purge port 14. The fuel in liquid phase adsorbed by the adsorption material 18 may be vaporized as it is desorbed from the adsorption material 18. Therefore, the vaporization heat of the fuel may decrease the temperature of the adsorption material 18 to lower the adsorption capacity (adsorption ability) of the adsorption material 18. However, as the temperature of the adsorption material 18 is decreased, the phase of the phase-change materials 24 contained in the heat storage material 22 changes from the liquid phase to the solid phase to produce latent heat that can increase the temperature of the adsorption material 18. As a result, potential decrease in temperature of the adsorption material 18 due to evaporation of the adsorbed fuel can be inhibited.

In this way, the heat storage material 22 can inhibit variation in temperature of the adsorption material 18. In addition, the right and left ends of each of the flat plates (heat storage material) 22 are fitted into the corresponding pair of the rail-like grooves 10d formed in the side wall 10b of the canister case 10, and the upper and lower ends of each of the flat plates 22 are held to contact with the upper and lower filters 17u and 17l, respectively. Therefore, even in the event that vibrations are applied to the canister 1, the flat plates 22 may not move relative to the canister case 10. Hence, the distances between the flat plates 22 and the adsorption material (pellets) 18 can be always maintained without being changed. As a result, the heat storage material 22 can effectively inhibit the temperature variation of the adsorption material 18.

Figure 4:
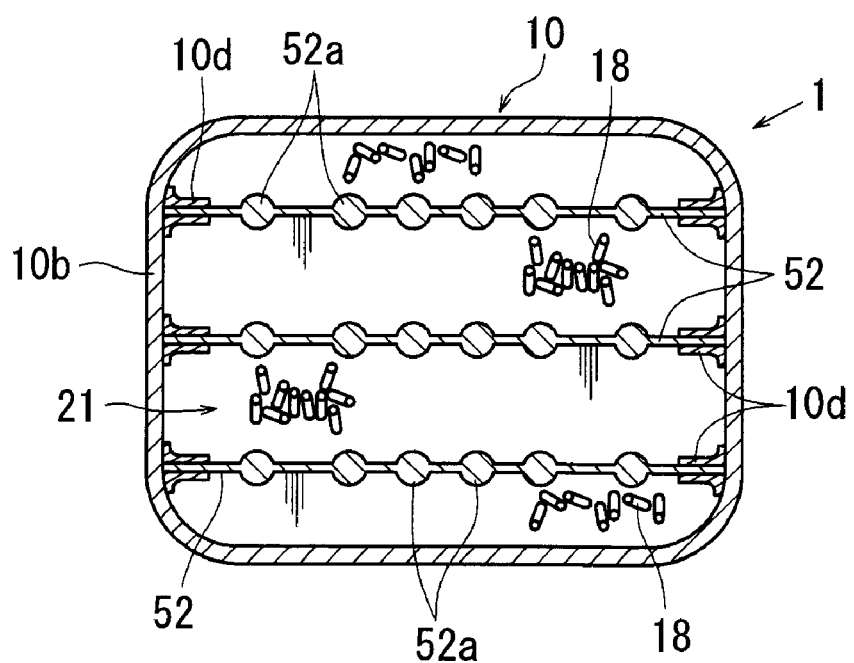
FIG. 4 is a horizontal sectional view of a canister according to a second embodiment of the present invention.
Figure 5:
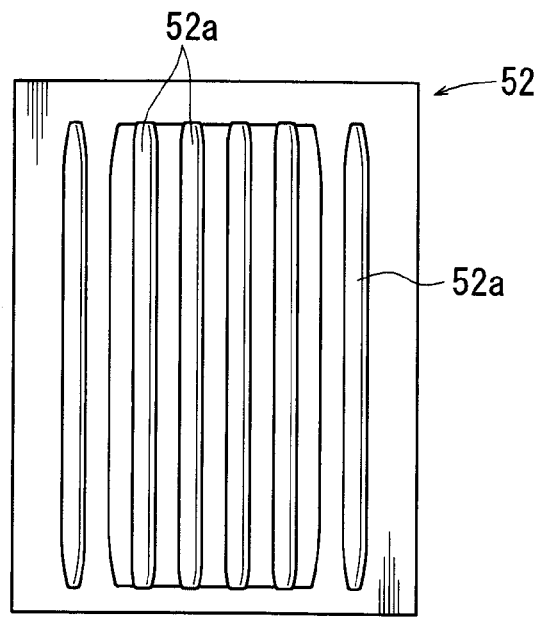
FIG. 5 is a front view of one of heat storage material plates of the canister.

A second embodiment will now be described with reference to FIGS. 4 and 5. This embodiment is a modification of the first embodiment. Therefore, in FIGS. 4 and 5, like members are given the same reference numerals as the first embodiment and the description of these members will not be repeated. According to the canister 1 of this embodiment, the heat storage material (flat plates) 22 is replaced with a heat storage material 52 also in forms of flat plates (hereinafter also called "flat plates 52" using the same reference numeral as the heat storage material) each having a plurality of linear projections 52a formed integrally therewith on opposite sides. With this arrangement, it is possible to increase the surface area of the heat storage material 52, so that the function of inhibiting the temperature variation of the adsorption material 18 can be further improved. In this embodiment, the linear projections 52 extend parallel to each other in the vertical direction. Although the linear projections 52 may extend in the horizontal direction, the vertical direction is preferable to minimize the influence to the flow of the fuel vapor, because the fuel vapor flows in the vertical direction. The number of the linear projections 52 may not be limited and it is possible to provide only one linear projection 52 on each side. In the case that the linear projections 52a are provided in a plural number as in this embodiment, the linear projections 52a on each side may be spaced equally from each other.

In order to form the flat plates 52 of this embodiment, a mixture of the microcapsules 23 and a suitable binder may be molded into a single flat plate by an injection molding process and the molded single flat may then be cut to form the flat plates. Alternatively, the mixture may be molded into a single flat plate by a press molding process and may then be cut into the flat plates. Otherwise, the mixture may be molded into a single flat plate by an extrusion molding process and may then be cut into the flat plates. In this case, the linear projections 52a may extend throughout the vertical length of the flat plates 52.

Figure 6:
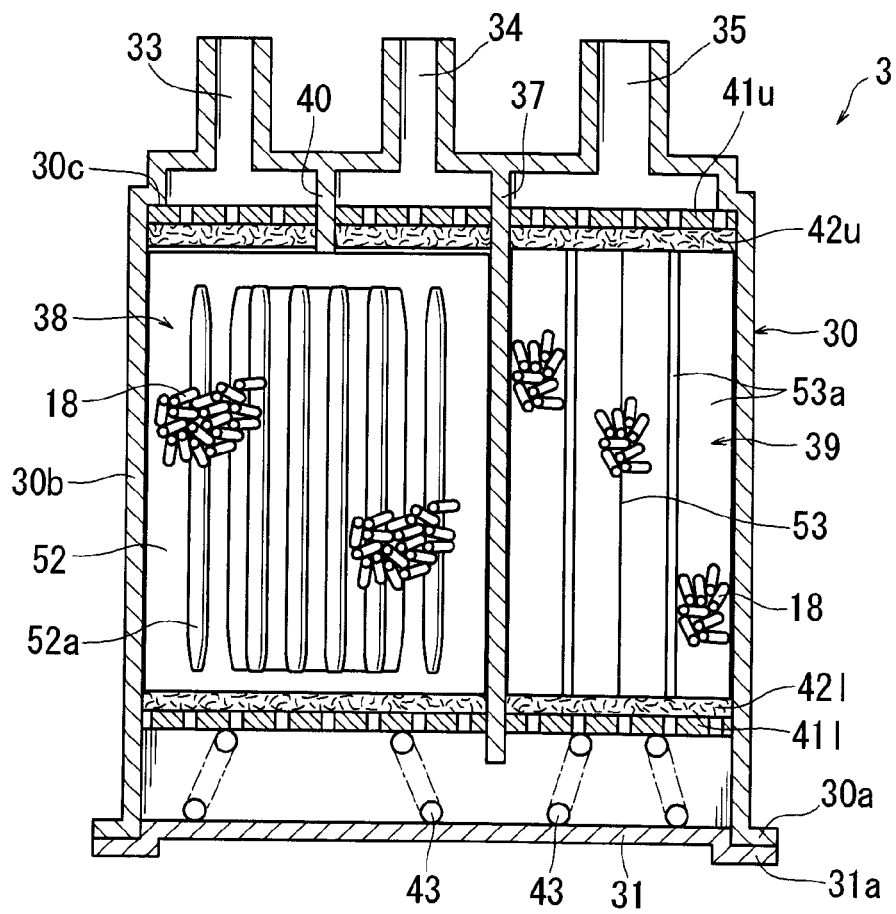
FIG. 6 is a vertical sectional view of a canister according to a third embodiment of the present invention.
Figure 7:
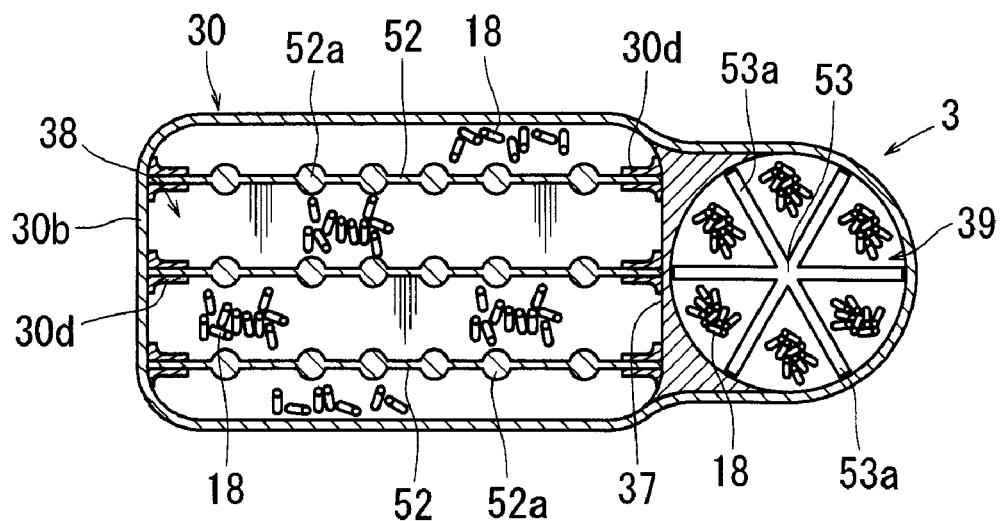
FIG. 7 is a horizontal sectional view of the canister.

A third embodiment of the present invention will now be described with reference to FIGS. 6 and 7. This embodiment is a modification of the second embodiment. Therefore, in FIGS. 6 and 7, like members are given the same reference numerals as the first and second embodiments and the description of these members will not be repeated. A canister 3 of this embodiment has a first adsorption chamber 38 and a second adsorption chamber 39 defined therein and the heat storage material 52 and a heat storage material 53 are disposed within the first and second adsorption chambers 38 and 39, respectively, such that a substantially U-shaped flow path is formed within the canister 3. The adsorption material 18 is disposed within each of the first and second adsorption chambers 38 and 39. In other words, the pellets 18 are filled into each of the first and second adsorption chambers 38 and 39. The canister 3 generally includes a canister case 30 and a cover 31 for closing a bottom opening of the canister case 30. The canister case 30 is made of synthetic resin and has a hollow configuration. The canister case 30 and the cover 31 may be made of the same synthetic resin, such as nylon. The canister case 30 and the cover 31 have a flange 30a and a flange 31a, respectively, that are joined together by a suitable joining technique, such as vibration welding and adhesion, in a state where the flanges 30a and 31a are in contact with each other. A tank port 33, a purge port 34 and an atmospheric port 35 are formed integrally with an upper wall of the canister case 30 and are arranged in this order from the left side to the right side in FIG. 6. Within the canister case 30, a partition wall 37 is formed integrally with the upper wall of the canister case 30. The partition wall 37 extends vertically downwardly from a part of the upper wall of the canister case 30 positioned between the purge port 34 and the atmospheric port 35 to a position spaced away from the cover 31 by a predetermined distance. Therefore, the inside of the canister case 30 is divided into the first adsorption chamber 38 on the side of the tank port 33 and the second adsorption chamber 39 on the side of the atmospheric port 35. And the substantially U-shaped flow path is formed to allow communication of the tank port 33 and the purge port 34 with the atmospheric port 35 via a space defined between the lower end of the partition wall 37 and the cover 31. A short auxiliary partition wall 40 is also formed integrally with the upper wall of the canister case 30 and extends vertically downwardly from a part of the upper wall of the canister case 30 positioned between the tank port 33 and the purge port 34.

Metal plates 41u and 41l each allowing gas to pass therethrough are positioned within an upper portion and a lower portion of the canister case 30, respectively. Upper and lower gas permeable filters 42u and 42l are positioned to contact with the inner faces of the plates 41u and 41l, respectively. Each of the first and second adsorption chambers 38 and 39 is delimited by a side wall 30b and the partition wall 37 of the canister case 30 with respect to a lateral direction (horizontal direction) and is delimited by the upper and lower gas permeable filters 42*u* and 42*l* with respect to the vertical direction. The upper plate 41*u* is in engagement with a stepped portion 30*c* formed on the upper portion of the side wall 30*b*. The lower plate 41*l* is normally biased upward toward the side of the tank port 33 by a coil spring 43 interleaved between the lower plate 41*l* and the cover 31. Therefore, the pellets (adsorption material) 18 filled into each of the first and second adsorption chambers 38 and 39 can be substantially uniformly distributed therewithin. As a material of each of the filters 42*u* and 42*l*, non-woven fabric made of synthetic resin, urethane form or other suitable material can be used. As each of the metal plate 41*u* and 41*l*, a perforated metal plate having a number of small holes, a metal mesh plate, or any other suitable metal material may be used.

The first adsorption chamber 38 defines a substantially rectangular column-like space. In this embodiment, three flat plates (heat storage material) 52 are disposed within the first adsorption chamber 38 in parallel to each other. The pellets (heat adsorption material) 18 are positioned on opposite sides of each of the flat plates 52 so as to closely contact therewith. Also, in this embodiment, each of the flat plates 52 is fitted into a corresponding one of pairs of rail-like grooves 30*d* formed in the side wall 30*b* and the partition wall 37. The lower ends of the flat plates 52 are in contact with the lower filter 42*l*. The upper ends of the flat plates 52 are in contact with the lower end of the partition wall 40.

The second adsorption chamber 39 defines a substantially cylindrical space having a length in the vertical direction, so that the fuel vapor can flow through the second adsorption chamber 39 in the vertical direction. A heat storage material 53 is in a form a feather of an arrow and includes a plurality of radially extending plate portions 53*a* (six feather portions are provided in this embodiment), so that six spaces are defined between the plate portions 53*a* and are spaced equally in the circumferential direction. Each of the six spaces extends in the vertical direction to allow the flow of the fuel vapor therethrough in the vertical direction and the pellets (adsorption material) 18 are filled closely into each of the six spaces. The second storage material 53 has a vertical length that is the same as the vertical length of the second adsorption chamber 39, so that the upper end and the lower end of the second storage material 53 contact with upper filter 42*u* and the lower filter 42*l*, respectively. Hence, the second storage material 53 is prevented from moving in the vertical direction. The diameter of the second storage material 53 defined by the radially outer ends of the plate portions 53*a* is set to be substantially the same as the inner diameter of the second adsorption chamber 39, so that the radially outer ends of the plate portions 53*a* contact with the inner wall of the second adsorption chamber 39. Hence, the second storage member 53 is prevented from moving in the horizontal direction in addition to the vertical direction. Also, the second storage material 53 has a plurality of microcapsules 23 bonded together by a suitable binder. For example, the mixture of the microcapsules 23 and the binder may be molded into a configuration of a long feather arrow by an extrusion molding process, and the extruded long feather arrow may be cut into a plurality of feathers each corresponding to the second storage material 53.

Figure 8:
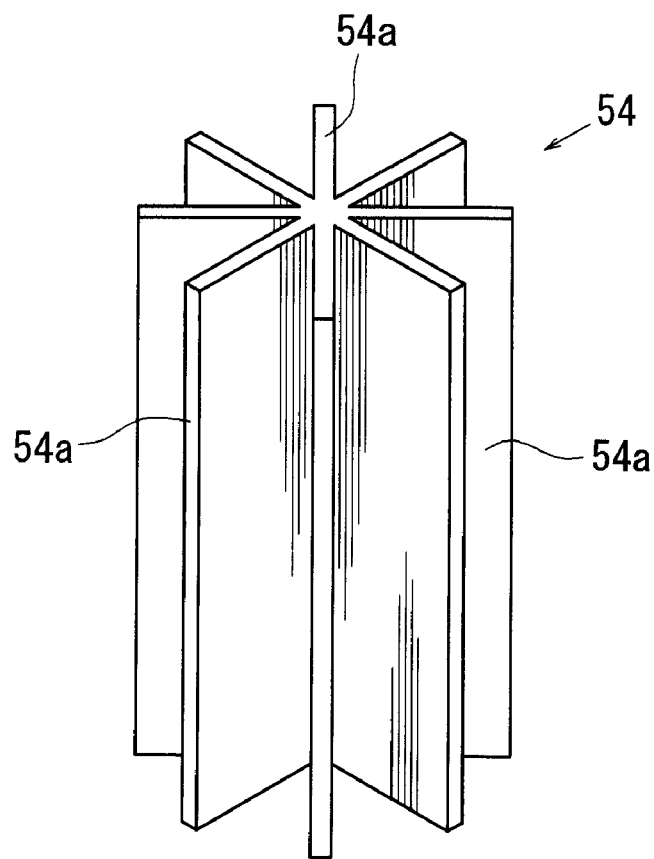
FIGS. 8, 9 and 10 are perspective views of alternative heat storage materials having different configurations.

The present invention may not be limited to the above embodiments but may be modified in various ways. For example, although the second storage material 53 of the third embodiment has six plate portions 53*a*, the number of the plate portions 53*a* may not be limited to six and may be three or more, such as an alternative second storage material 54 having eight plate portions 54*a* shown in FIG. 8. As the number of the plate portions increases, contact areas between the second storage material 53 and the adsorption material 18 increases, resulting in improvement in the function of inhibiting the temperature variation.

Figure 9:
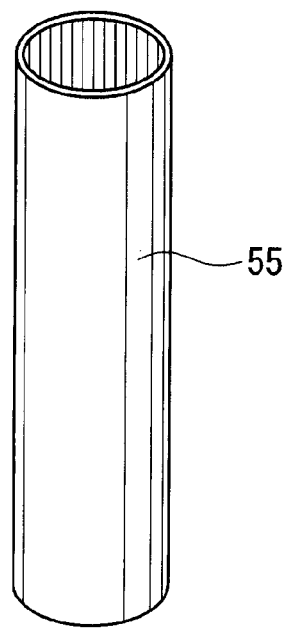
Figure 10:
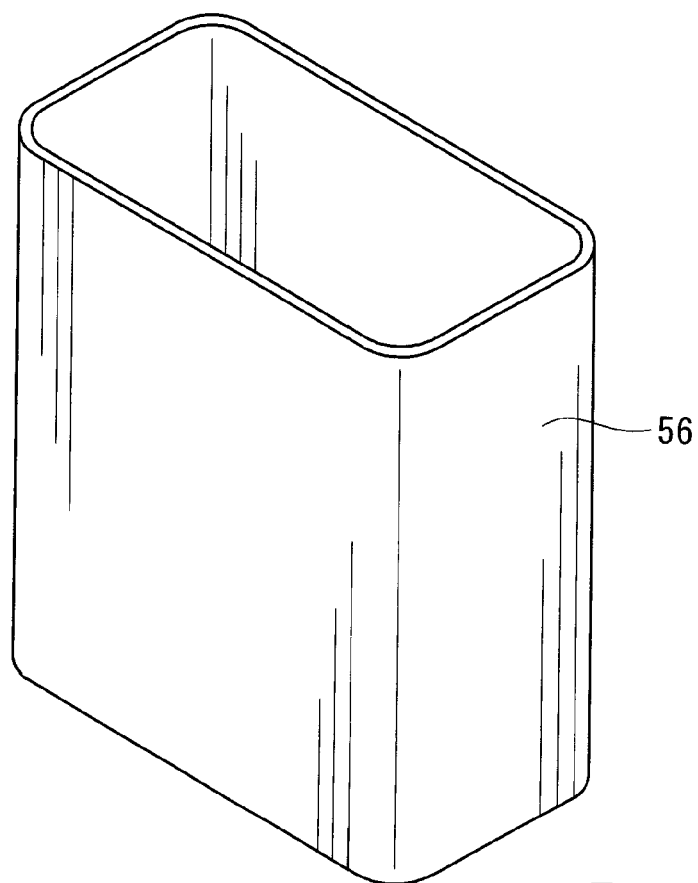

In addition, the shapes of the heat storage materials are not limited to those described in connection with the above embodiments. For example, a heat storage material 55 having a cylindrical tubular configuration with open upper and lower ends shown in FIG. 9 and a heat storage material 56 having a rectangular tubular configuration with open upper and lower ends shown in FIG. 10 may be used. The heat storage material 55 having the cylindrical tubular configuration is adapted to be disposed within a cylindrical adsorption chamber. The heat storage material 56 having the rectangular tubular configuration is adapted to be disposed within a rectangular column-like adsorption chamber.

Figure 11:
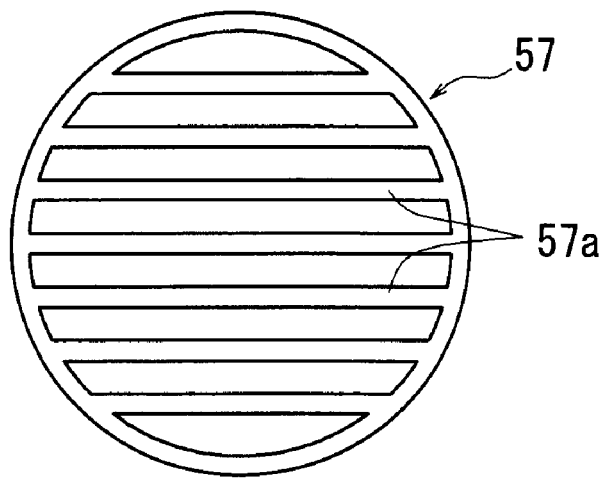
FIGS. 11 to 16 are plan views of further alternative heat storage materials.
Figure 12:
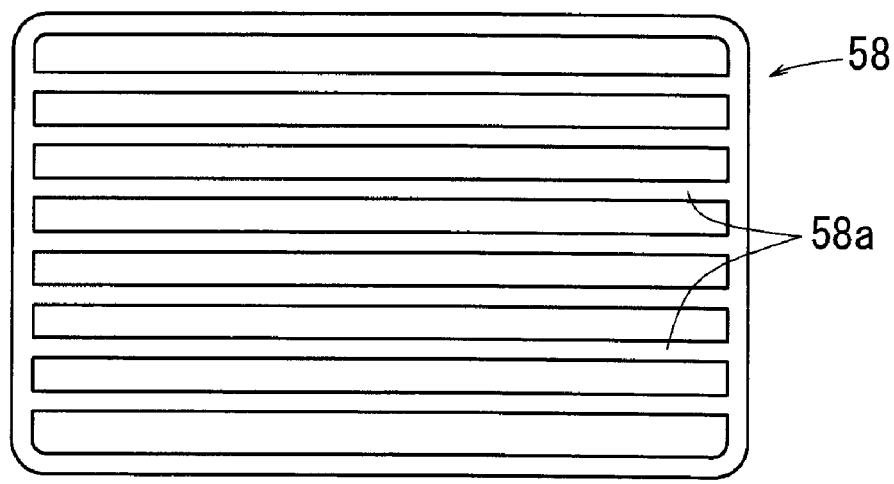

It is also possible to use a cylindrical heat storage material 57 shown in FIG. 11 and a rectangular column-like heat storage material 58 shown in FIG. 12. The heat storage material 57 has a plurality of plate portions 57*a* defining slots therebetween for receiving the adsorption material. Similarly, the heat storage material 58 has a plurality of plate portions 58*a* defining slots therebetween for receiving the adsorption material. With these arrangements, it is possible to further increase the contact area with the adsorption material, so that the function of inhibiting the temperature variation can be further improved and it is possible to inhibit the temperature variation substantially uniformly within the adsorption chamber.

Figure 13:
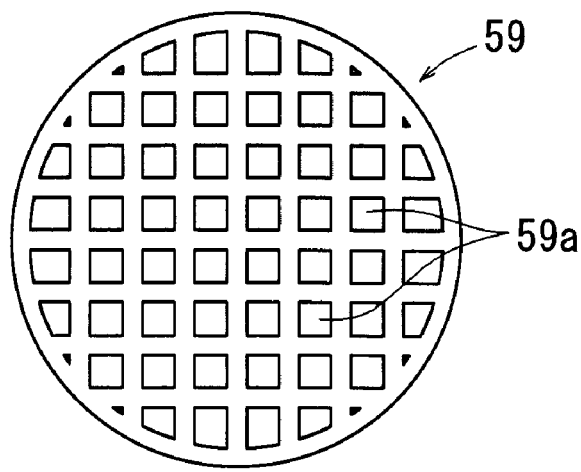
Figure 14:
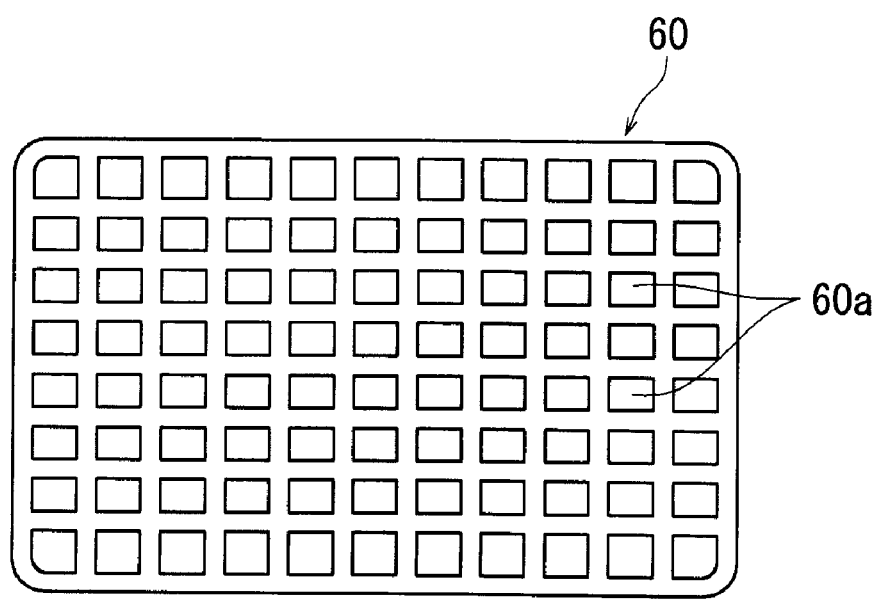

Furthermore, it is also possible to use a cylindrical heat storage material 59 shown in FIG. 13 and a rectangular column-like heat storage material 60 shown in FIG. 14. The heat storage material 59 has a grid-like configuration defining a plurality of vertically elongated square or rectangular holes 59*a*. Similarly, the heat storage material 60 has a grid-like configuration defining a plurality of vertically elongated square or rectangular holes 60*a*. With these arrangements, it is possible to further increase the contact area with the adsorption material, so that the function of inhibiting the temperature variation can be further improved and it is possible to inhibit the temperature variation substantially uniformly within the adsorption chamber. When the heat storage materials 59 and 60 are used, it may be preferable that the adsorption material 18 is in forms of small-diameter pellets or granules.

Figure 15:
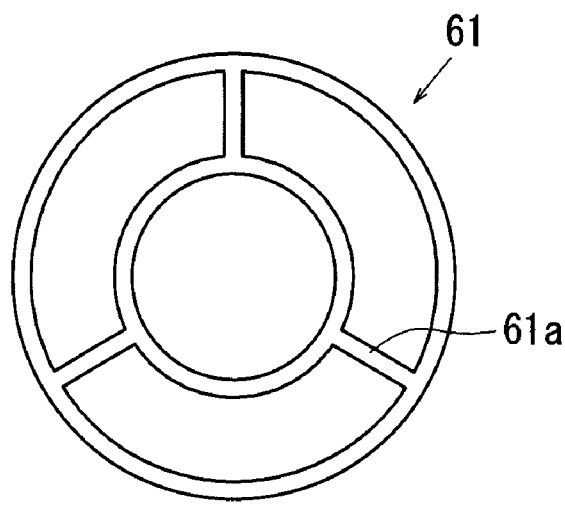
Figure 16:
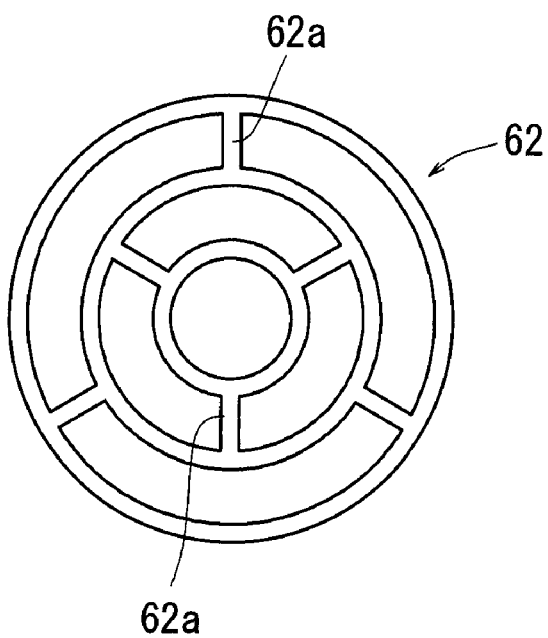

Furthermore, it is also possible to use cylindrical heat storage materials 61 and 62 shown in FIGS. 15 and 16, respectively. The heat storage material 61 has a double-wall structure, in which outer and inner cylindrical wall portions are connected to each other via radially extending connecting portions 61*a*. The heat storage material 62 has a triple-wall structure, in which outer, intermediate and inner cylindrical wall portions are connected to each other via radially extending connecting portions 62*a*. Although not shown in the drawings, cylindrical heat storage materials having four or more coaxial wall portions may be possible. It is also possible to use rectangular heat storage materials having two or more coaxial rectangular wall portions connected by connecting portions.

Each of the heat storage materials 55 to 62 can be formed by mixing the microcapsules 23 and the binder into a mixture and molding the mixture into the heat storage material by an extrusion molding process.

In the case of the heat storage materials 56, 58 and 60 having the rectangular column-like configurations and adapted to be disposed within rectangular column-like adsorption chambers conforming thereto, no rail-like groove is necessary to be provided. Further, in the case of the heat storage materials 53 to 62 having column-like or substantially column-like configurations, the outer diameters can be set to be smaller than the inner diameters of the corresponding adsorption chambers. Thus, because the upper and lower ends are held by corresponding walls (such as filters) of the canister cases, the heat storage materials 53 to 62 may be prevented from moving in the horizontal direction by the frictional forces applied to their upper and lower ends.

This invention claims:

1. A canister comprising:
   an adsorption chamber defined by a chamber wall including two walls opposed to each other;
   an adsorption material and a heat storage material disposed within the adsorption chamber, the adsorption material being capable of adsorbing or desorbing fuel vapor, and the heat storage material being capable of absorbing or dissipating latent heat in response to variation of temperature within the adsorption chamber;
   wherein the heat storage material is molded to have a predetermined shape and contains a plurality of microcapsules and a binder mixed thereto,
   each of the microcapsules contains therein a heat-change material;
   the heat storage material has a size capable of contacting or positioning proximal to the two opposed walls, so that the heat storage material can be held between the two opposed walls.

2. The canister as in claim 1, wherein the heat storage material is disposed to extend along a direction of flow of the fuel vapor within the adsorption chamber.

3. The canister as in claim 2, wherein the two opposed walls are two opposed side walls, the heat storage material is molded into a plurality of plates capable of being held between the two opposite side walls of the canister chamber and arranged to be substantially equally spaced from each other within the adsorption chamber.

4. The canister as in claim 2, wherein the two opposed walls are upper and lower walls, and the heat storage material has a length in a vertical direction and capable of being held between the upper and lower walls of the adsorption chamber, and the heat storage material has a column-like configuration and defines at least one space therein extending in the vertical direction, so that the fuel vapor can flow through the at least one space.

5. The canister as in claim 2, wherein the heat storage material has a column-like configuration defining at least one space therein extending in the vertical direction, so that the fuel vapor can flow through the space, and the chamber wall of the adsorption chamber includes a side wall that can contact with the heat storage material when the heat storage material is positioned within the adsorption chamber.

6. A canister comprising:
   an adsorption chamber defined by a chamber wall;
   an adsorption material and a heat storage material disposed within the adsorption chamber, the adsorption material being capable of adsorbing or desorbing a fuel vapor, and the heat storage material being capable of absorbing or dissipating latent heat in response to temperature of the heat storage material;
   wherein the heat storage material is molded from a mixture of a plurality of microcapsules and a binder,
   each of the microcapsules contains therein a heat-change material;
   the heat storage material is prevented from moving relative to the chamber wall of the adsorption chamber in at least one of first and second directions perpendicular to each other.

7. The canister as in claim 6, wherein the first direction is parallel to a direction of flow of the fuel vapor within the adsorption chamber and the second direction is perpendicular to the first direction.

8. The canister as in claim 6, wherein the heat storage material comprises a plurality of plates spaced from each other and arranged such that surfaces of the plates extend parallel to a direction of flow of the fuel vapor within the adsorption chamber.

9. The canister as in claim 8, wherein each of the plates includes linear projections formed on opposite sides.

10. The canister as in claim 9, wherein the linear projections extend parallel to the direction of flow of the fuel vapor.

11. The canister as in claim 6, wherein the heat storage material comprises a single column having a length parallel to the direction of flow of the fuel vapor and having a substantially uniform cross section along the length.

12. The canister as in claim 11, wherein the column of the heat storage material has an outer configuration substantially conforming to the configuration of the adsorption chamber.

13. The canister as in claim 12, wherein the adsorption chamber has a substantially cylindrical configuration.

14. The canister as in claim 13, wherein the column of the heat storage material has a plurality of radially extending plate portions.

15. The canister as in claim 13, wherein the column of the heat storage material has at least one space formed therein and extending in the direction of the length of the column.

16. The canister as in claim 12, wherein the adsorption chamber has a substantially polygonal column-like configuration.

17. The canister as in claim 16, wherein the column of the heat storage material has at least one space formed therein and extending in the direction of the length of the column.

18. The canister as in claim 6, wherein the chamber wall includes upper and lower walls and a side wall, the side wall is defined by a canister case, and the upper and lower walls are defined by filters mounted within the canister case.

19. The canister as in claim 6, wherein the adsorption material is in forms of pellets or granules.

* * * * *